April 14, 1953 — M. DONIAK — 2,635,016
PROTECTING MEANS FOR HEATED CYLINDERS AND THEIR BEARINGS
Filed Oct. 25, 1951
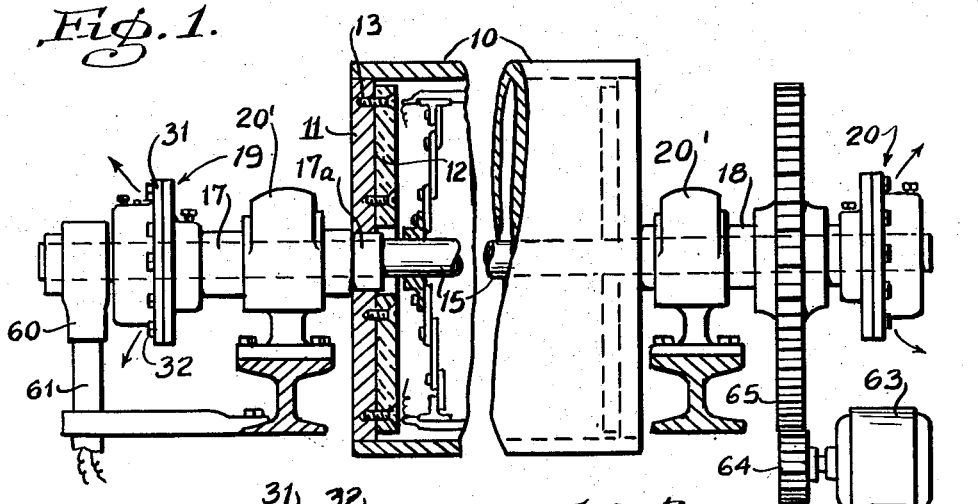
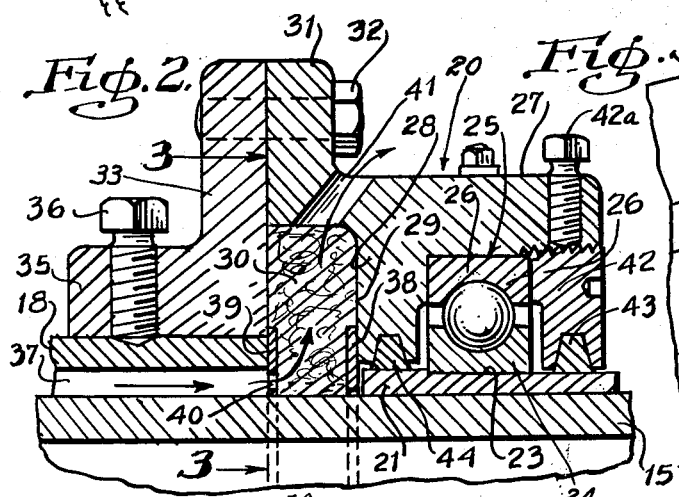
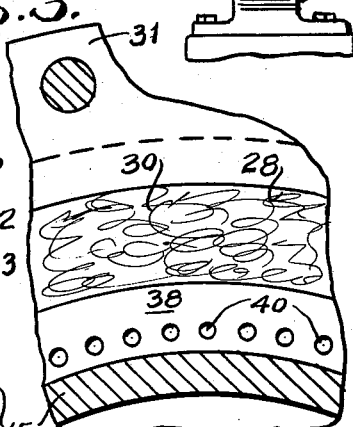
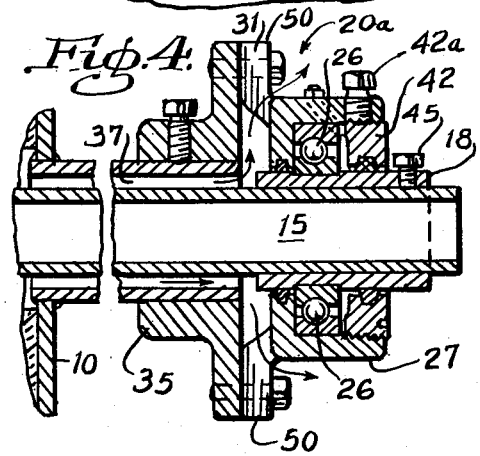
INVENTOR.
Michael Doniak
BY Robt. D. Pearson
ATTORNEY.

Patented Apr. 14, 1953

2,635,016

UNITED STATES PATENT OFFICE 2,635,016

PROTECTING MEANS FOR HEATED CYLINDERS AND THEIR BEARINGS

Michael Doniak, Compton, Calif.

Application October 25, 1951, Serial No. 253,177

8 Claims. (Cl. 308—77)

This invention relates to a protecting means for rotatable drying cylinders and their bearings when said cylinders are maintained in a heated condition during their operation.

More specifically considered, the present invention pertains to an improvement upon the bearing structure described in the United States Patent Number 2,571,426, on a Rotatable Electrically Heated Drying Cylinder, issued to me October 16, 1951.

An object of the present invention is to improve upon said patented structure by preventing entrance into the cylinder of oil used to lubricate its bearings.

Another object is to provide for a more efficient heat insulation of the bearings of the cylinder.

Yet another object is more effectively to protect the bearings from moisture and resulting rust.

Other objects, advantages and features of invention will hereinafter appear.

Referring to the accompanying drawing, illustrative of preferred embodiments of the invention, Fig. 1 is a view, partly in side elevation and partly in vertical mid-section, with the mid-length part of the rotatable drying cylinder broken out to contract the view.

Fig. 2 is an enlarged, fragmentary, vertical mid-section taken through the upper half of one of the twin bearing structures.

Fig. 3 is a fragmentary cross section on line 3—3 of Fig. 2.

Fig. 4 is a longitudinal mid-section of a modified bearing structure, parts being broken out to contract the view.

Fig. 5 is a fragmentary end elevation of the bearing structure of Fig. 4, looking at the right end of the latter view.

Referring in detail to the drawing, and describing first the structure shown in Figs. 1, 2 and 3, the cylindrical metal shell 10 has its end portions fitted around and secured to twin circular heads one of which, designated 11, is shown in Fig. 1. Said cylinder may be interiorly constructed in the same manner as the rotatable heating cylinder disclosed in my aforesaid patent, hence its interior structure need not be described, though it is pointed out that heat insulation of the bearing structures presently to be described is aided by attaching a disk 12 of heat insulating material to the inner face of each aforesaid cylinder heads 11, said disk being shown attached to said head by means of a plurality of screws 13. Said cylinder 10 is rotatably supported upon a non-rotatable pipe or tubular shaft 15, which, as in my aforesaid patent, is loosely surrounded by sleeve shafts 17 and 18; the present invention pertaining particularly to improved bearing structures, generally designated 19 and 20, whereby said sleeve shafts are rotatably supported upon said central shaft 15 in an antifrictional, heat insulated manner, the heat insulating feature protecting said bearings against injury from the heat generated within the aforesaid drying cylinder 10.

Said sleeve shaft 17 has a diametrically reduced end portion 17a centrally secured, by a press fit or otherwise, to the adjacent cylinder head 10, and the sleeve shaft 18 is secured centrally to the opposite head of said drum in any desirable conventional manner. Twin conventional bearing structures 20' are shown supporting the sleeve shaft sections 17 and 18. These bearing structures may be of the roller bearing type.

The bearing structures 19 and 20 are twins, except that one is a "right" and the other a "left," therefore a description of the bearing structure 20, shown in detail in Fig. 2, will suffice for both. A sleeve 21 is fitted around and secured to the central shaft 15 in a considerably spaced relation to the drying cylinder 10. Said sleeve desirably has around it a shallow groove 23, rectangular in cross section and within said groove is fitted, with a press fit, the inner ring 24 of a ball bearing structure 25. Around the outer ball bearing ring 26 is fitted a collar 27 having adjacent to one of its ends an internal annular flange 28, said flange abutting against the adjacent end of said ball bearing ring 26, but being shown slightly spaced away from the inner ball bearing ring 24.

At that side of the aforesaid flange 28 which is directed away from the ball bearing structure 25 a recess 29 is provided, which is filled with asbestos or other heat insulating material 30. Radially beyond said recess the collar 27 is provided with a flanged extension 31 and through this flanged part pass cap screws 32 which secure a cap 33 to said collar 27, said cap mostly covering that side of the recess 29 which is opposite to the aforesaid internal flange 28. Said cap 33 has a hub like extension 35 fitted around one end portion of the already mentioned sleeve shaft section 18 and shown clamped thereto by means of a set screw 36.

The internal diameter of said sleeve shaft section 18 is considerably greater than the external diameter of the tubular central shaft 15, leaving an annular space 37 between said two shafts, the bearing and cap structures which have been described maintaining said sleeve shaft section in a truly concentric relation to said central shaft 15. One end of said sleeve shaft section 18 is flush with the inner end of said cap 33 and assists in enclosing the aforesaid recess 29. Suitable rings 38 and 39 are provided to keep in place the heat insulating material 30, the latter ring having through it small apertures 40 which communicate with the annular space 37. From the radially outer part of the aforesaid annular recess 29 lead a plurality of vent passages 41, which pass through the flanged cap 31, as shown in Fig. 2.

Referring now to that end portion of the cap structure 20 which is on the opposite side of the aforesaid ball bearing structure, an annular sealing means is provided which comprises an externally screwthreaded outer sealing ring 42 and an inner sealing ring 43, the latter ring fitting around the sleeve 21 and being shown outwardly tapered as viewed in cross section. Said ring 42 is internally grooved to receive said ring 43. Said collar 27 is internally screwthreaded to have screwed into it said ring 42, additional security being obtained by providing a set screw 42a. The aforesaid ring or collar 42 performs a locking function in relation to the outer ring 26 of the ball bearing structure, but said ring, when screwed down, is spaced away from the inner bearing ring 24.

A slightly modified bearing structure 20a is shown in Figs. 4 and 5, which may be substituted for the already mentioned bearing structures 19 and 20. Said bearing structure 20a is provided with an additional set screw 45 to clamp the sleeve 18 to the shaft 15.

Also, instead of the circularly flanged member 31 of Fig. 3 a circularly flanged structure is shown having spaced apart attaching arm portions 50. In other respects the structure shown in Figs. 4 and 5 is substantially the same as that shown in the preceding views, and is therefore lettered in the same manner.

At the left end of Fig. 1 is shown (as in my aforesaid patent) a housing 60 supported by and communicating with a tubular standard 61, said standard and housing being a part of the means for conducting to the central shaft 15 and cylinder 10 the wires which carry electric current to the heater in said cylinder, these parts, separately considered, forming no part of the present invention. Likewise, in Fig. 1 are shown the motor 63, motor gear 64 and gear 65, the latter gear driving the sleeve shaft section 18 and cylinder 10.

I claim:

1. In a structure of the kind described, a plurality of horizontally spaced apart supports, a central shaft which is subjected to heat and is non-rotatably mounted upon said supports, a sleeve fitted around said shaft in a secured relation thereto, a ball bearing structure comprising an inner and an outer ring and bearing balls between said rings, said inner ring being fitted around and secured to said sleeve, a collar fitted around said ball bearing structure, said collar having an internal annular flange which abuts one end of the other ring of said ball bearing structure, there being a clearance between the radially inner part of said flange and the adjacent end of the inner ring of said ball bearing structure, said collar having an air vented annular recess surrounding its inner periphery in that side of its said internal annular flange which is directed away from said ball bearing structure, an annular cap structure surrounding the aforesaid shaft and secured to the reecssed part of said collar, said cap closing the otherwise open side of said recess, and a filling of heat insulating material in said recess.

2. The subject matter of claim 1, and said sleeve having around it a shallow groove and said collar being fitted into said groove with a press fit.

3. The subject matter of claim 1, and a porous filling of heat insulating material in said recess, there being an air supply passage leading into said recess and an air vent leading therefrom.

4. In a bearing means of a heat insulating character for supporting a sleeve shaft upon a central shaft with an annular space between the exterior surface of said central shaft and the interior surface of said sleeve shaft, a bearing structure fitting around said central shaft, a collar having a body portion fitting around said bearing structure and an internal annular flange with its inner edge in a surrounding sealed relation to said sleeve shaft one face of said flange covering one end portion of said bearing structure, there being an annular recess in said collar, said recess surrounding said sleeve shaft and the outer face of said internal flange forming the bottom or inner side of said recess, and a cap having a central body portion which overlies the outer side or top of said recess, said cap having a peripheral flange portion secured to the peripheral portion of said collar.

5. The subject matter of claim 4, and there being air passage means between the aforesaid annular space and the inner part of said recess, and air vent means leading from the outer part of said recess to the external atmosphere.

6. The structure set forth in claim 5, and a combined sealing ring and locking collar in substantially an abutting relation to the radially outer part of that end of said bearing structure which is farthest from the aforesaid recess, said collar being internally screwthreaded and said ring being screwed thereinto.

7. The structure set forth in claim 4, and a sleeve tightly fitted around said inner shaft and interposed between it and the aforesaid collar and bearing structure, said sleeve having an external shallow groove therearound into which the inner part of said bearing structure is press fitted.

8. In a structure of the kind described, the combination, with a rotatably supported sleeve shaft, and a heated shaft therewithin, the external diameter of said heated shaft being considerably less than the internal diameter of said sleeve shaft; of a bearing structure carried by said heated shaft supporting said sleeve shaft in a concentric relation to said heated shaft, said bearing structure comprising a collar surrounding said heated shaft, a bearing means interposed between said collar and heated shaft, said collar having at one end a recess occupying its radially inward portion, and a cap secured to said collar, said cap overlying the recess in said recessed end of said collar, said cap being fitted around and secured to an end portion of said sleeve shaft, and said recess being in communication both with the external atmosphere and the annular space between said two shafts.

MICHAEL DONIAK.

References Cited in the file of this patent

UNITED STATES PATENTS

| Number | Name | Date |
|---|---|---|
| 2,493,160 | Morley | Jan. 3, 1950 |

FOREIGN PATENTS

| Number | Country | Date |
|---|---|---|
| 578,765 | Great Britain | July 11, 1946 |